(12) United States Patent
Kogler et al.

(10) Patent No.: US 8,550,886 B2
(45) Date of Patent: Oct. 8, 2013

(54) VENTILATION DEVICE FOR A VEHICLE INTERIOR

(75) Inventors: Mike Kogler, Karlsruhe (DE); Younes Chlyeh, Worth (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 1403 days.

(21) Appl. No.: 12/090,822

(22) PCT Filed: Oct. 18, 2006

(86) PCT No.: PCT/EP2006/010171
§ 371 (c)(1),
(2), (4) Date: Aug. 11, 2008

(87) PCT Pub. No.: WO2007/045507
PCT Pub. Date: Apr. 26, 2007

(65) Prior Publication Data
US 2008/0299888 A1    Dec. 4, 2008

(30) Foreign Application Priority Data

Oct. 21, 2005    (DE) .......................... 10 2005 050 881

(51) Int. Cl.
*B60S 1/54*    (2006.01)
*B60H 1/26*    (2006.01)

(52) U.S. Cl.
USPC .............. 454/75; 454/127; 454/143; 454/155

(58) Field of Classification Search
USPC .................................... 454/75, 127, 155, 143
See application file for complete search history.

(56) References Cited

U.S. PATENT DOCUMENTS

| | | | | | |
|---|---|---|---|---|---|
| 3,101,690 | A | * | 8/1963 | O'Day et al. | 72/325 |
| 3,703,141 | A | * | 11/1972 | Pernoud | 454/155 |
| 3,736,858 | A | * | 6/1973 | Mercier | 454/286 |
| 4,516,483 | A | * | 5/1985 | Bosman | 454/301 |
| 4,679,495 | A | * | 7/1987 | Locker | 454/299 |
| 4,699,322 | A | * | 10/1987 | Jobst | 239/503 |
| 4,864,919 | A | * | 9/1989 | Schulz et al. | 454/127 |
| 5,137,491 | A | * | 8/1992 | Ishihara et al. | 454/152 |
| 5,364,305 | A | * | 11/1994 | Zieve | 454/261 |
| 5,470,276 | A | * | 11/1995 | Burnell et al. | 454/155 |
| 5,472,380 | A | * | 12/1995 | Sarazen et al. | 454/290 |
| 5,700,192 | A | * | 12/1997 | Rump | 454/258 |

(Continued)

FOREIGN PATENT DOCUMENTS

| | | | |
|---|---|---|---|
| DE | 1212478 | * | 6/1969 |
| DE | 19 29 827 | | 1/1970 |
| EP | 0 717 247 | | 6/1996 |
| WO | 03/091049 | | 11/2003 |

*Primary Examiner* — Steven B McAllister
*Assistant Examiner* — Frances H Kamps
(74) *Attorney, Agent, or Firm* — Fay Kaplun & Marcin, LLP

(57) ABSTRACT

A ventilation device is for ventilating a motor vehicle interior. The ventilation device comprises an air supply channel and an outflow region. The outflow region is provided with a first component and a second component which can be brought into at least one first state of displacement and a second state of displacement in relation to each other, in order to generate a first air flow and a different second air flow. The first component and the second component have a first lamella structure and a second lamella structure, according to the state of displacement, for producing a first air flow and a second air flow with different opening angles.

12 Claims, 7 Drawing Sheets

(56) References Cited

U.S. PATENT DOCUMENTS

| | | | |
|---|---|---|---|
| 5,873,778 A * | 2/1999 | Badenhorst | 454/155 |
| 6,159,092 A * | 12/2000 | Elder | 454/155 |
| 6,941,967 B2 * | 9/2005 | Butera et al. | 137/351 |
| 6,942,563 B2 * | 9/2005 | Pesch et al. | 454/152 |
| 7,044,849 B2 * | 5/2006 | Dippel | 454/143 |
| 7,544,121 B2 * | 6/2009 | Jahn et al. | 454/127 |
| 7,731,261 B2 * | 6/2010 | Wenzel et al. | 296/70 |
| 2005/0143002 A1 * | 6/2005 | Orendorff | 454/324 |

* cited by examiner

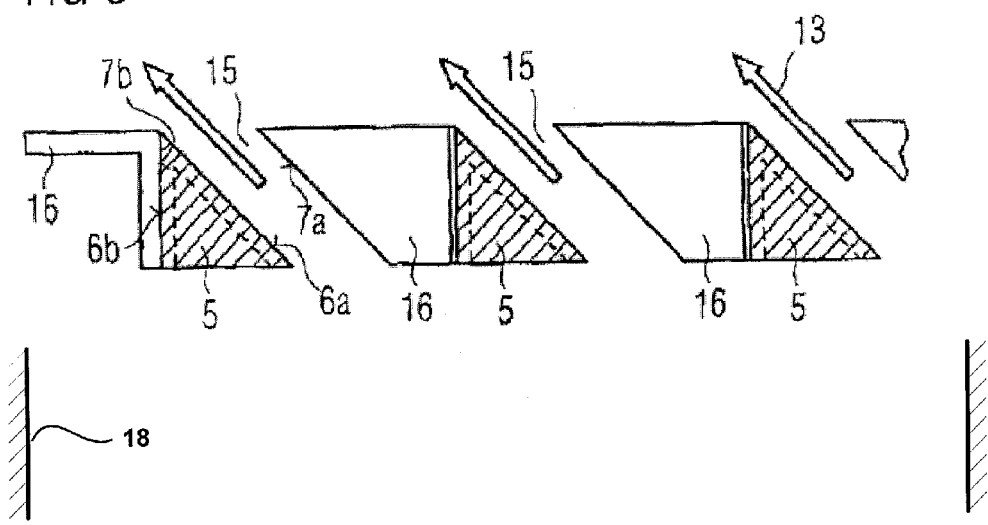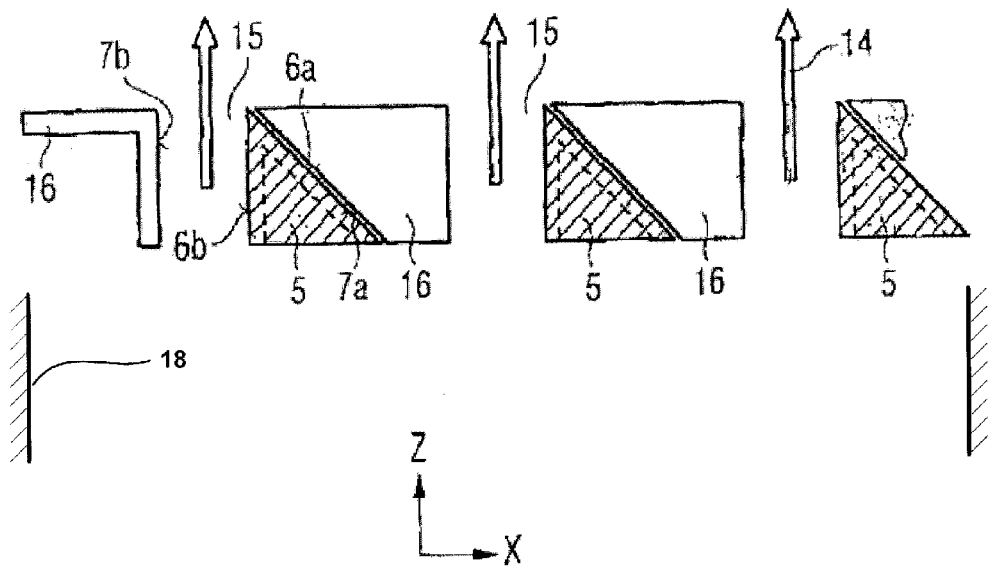

VENTILATION DEVICE FOR A VEHICLE INTERIOR

FIELD OF INVENTION

The invention relates to a ventilation device, in particular to a ventilation device for a vehicle interior.

BACKGROUND INFORMATION

Ventilation devices in motor vehicles are basically known. On the one hand, they are applied for ventilating the interior, and on the other hand are applied against a misting or a frosting of the window panes (defrost function), above all of the window panes in the front region. Ventilation devices are for example integrated into the interior as a constituent part of an instrument panel.

A ventilation device which includes a defrosting function as well as a direct ventilation of the interior, is disclosed in DE 102 19 053 A1.

This ventilation device contains an air feed channel as well as an outflow region for ventilating the interior. A first and second component is provided in the outflow region, which may be brought into different conditions of displacement relative to one another. In each case, different closure surfaces of the first and second component bear on one another in the different conditions of displacement. Airflows into the interior with different outflow angles may be released by way of this.

Advantageously, at least two displacement conditions may be set, wherein an airflow is directed to the windscreen in the second displacement condition, and the airflow is directed to a greater extent towards the centre of the vehicle interior in the first displacement condition.

The disadvantage of this ventilation device is the fact that the airflows, although being able to be orientated in a coarse manner, for example on the one hand in the direction of the windscreen and on the other hand in the direction of the centre of the interior, however a more sophisticated guidance or control of the airflow is not present.

In particular, it is difficult with such a ventilation device, on the one hand to produce an adequately large airflow in the edge region of the window panes, in order to prevent or alleviate misting, and on the other hand to direct the airflow into the interior, such that this does not act in a disturbing manner with regard to the driver or front seat passenger.

SUMMARY OF INVENTION

The present invention relates to a ventilation device which effects an advantageous formation of the airflow, in particular may be applied on the one hand for the direct ventilation of an interior of a vehicle, and on the other hand for the ventilation of a windscreen of the vehicle.

Two airflows which are completely different with regard to their outflow behavior may be realized by way of the fact that the first component or the second component comprise a first lamellar structure, and the first or the second component comprise a second lamellar structure which differs from the first one, and that in the first displacement condition of the first and second component, air may flow out through the first lamellar structure for producing a first airflow with a first opening angle, and in the second displacement condition, air may flow out through the second lamellar structure for producing a second airflow, at a second opening angle which is different form the first one.

The opening angle of the airflow is defined by the orientation of the lamellae belonging to the lamellar structure, and the air passage gap produced by way of this. If for example, the lamellae of a lamellar structure are orientated parallel to one another, then a directed airflow having a negligible opening angle may be produced. If the lamellae of a lamellar structure are fanned-out, then a fanned-out airflow having an opening angle according to the degree of fanning-out of the lamellae may be produced.

The ventilation device according to the invention combines two different lamellar structures, in order to realize two different airflows. In particular, the lamellae of the lamellar structures are arranged in a fixed/unmovable manner in the respective component. A mechanism for tilting only the lamellae, in order to change the airflow, as is known for example with side blowers in instrument panels, is no longer necessary due to this combination of different fixed lamellar structures.

One advantageous further formation of the invention envisages the first lamellar structure comprising lamellae lying parallel to one another, and the second lamellar structure having lamellae tilted to one another in a fanned manner, and air being cable of flowing out through the first lamellar structure in the first displacement condition of the first and second component, for producing a first, directed airflow, and air being able to flow out through the second lamellar structure in the second displacement condition, for producing a second fanned-out airflow.

The application of such a ventilation device in the interior of a motor vehicle is particularly adjacent to a windscreen, in particular as a constituent part of an instrument panel. With the fanned-out airflow, which may be produced by way of the ventilation device, one may adequately subject the windscreen to airflow over the complete width. With the directed airflow which is produced by the first lamellar structure, one may deflect air into the interior in a targeted manner, without disturbing a driver or front seat passenger. In particular, one may apply a ventilation device according to the invention in a significantly reduced width with respect to conventional ventilation devices, without entailing disadvantages with regard to the defrosting function.

Here, fan-like is to be understood in that adjacent lamellae of the second lamellar structure are tilted to one another. The degree of tilting thereby increases to the next neighbor of a lamella, to the next but one neighbor, etc. However "fanned-out" is also to be understood if only certain regions of the lamellar structure have this arrangement, or individual lamellae within such a region do not follow this behavior. For example, a lamellar structure with three adjacent regions, wherein several lamellae which are aligned at a first angle are provided in the middle region, several lamellae which are arranged at a second angle which is positively tilted to the first angle, are provided in the left edge region, and likewise several lamellae which are arranged at a third angle negatively tilted to the first angle are arranged in the right edge region, is also likewise to be understood as "fan-like".

Moreover "fan-like" is only to be understood as those lamellar structures which effect a fanning-out of the air with an opening angle of at least 10°, preferably at least 30°, or whose air passage gaps defined by the lamellae are tilted by a maximal angle of at least 10°, preferably 30° (in the case of a "uniform" fanning-out, this angle would be defined by the tilting of the two gaps lying on the edge side).

The lamellae are preferably planar plates or platelets. This permits large air gaps and thus a large air passage through the lamellar structure. Alternatively, the lamellae may also be designed as compact, solid webs, whose side surfaces are angled in a manner in order to produce a directed and fanned-out airflow.

One further advantageous formation of the invention envisages the first and the second lamellar structure being grid-like.

According to the invention, a multitude of lamellae are provided, which are arranged in a planar manner in several parallel rows at defined distances.

One further advantageous formation of the invention envisages in each case different closure surfaces of the first and the second component bearing on one another in the different displacement conditions of the first and second component, for realizing different outflow angles of the airflow, additionally to the fanning-out and directing.

According to this advantageous further formation, it is possible for example in the case of a ventilation device applied in an instrument panel, in the first displacement condition, to guide the directed airflow more into the interior of the vehicle, and in the second displacement condition to guide the airflow directly against the windscreen.

One further advantageous formation of the invention envisages the first component and/or the second component comprising prismatically, preferably triangularly shaped webs.

In particular, the outflow angle is defined by the sides of the prismatic webs.

A further advantageous formation of the invention envisages the prismatically shaped webs being arranged in a common plane and parallel to one another, and, arranged one after the other between two adjacent webs, a first lamellar structure and a second lamellar structure with lamellae aligned perpendicularly to the parallel webs.

The lamellae of the second lamellar structure are thus fanned-out parallel to the webs.

The elements in the sequence web-first lamellar structure-web etc., are preferably arranged within a common plane.

One may realize a particularly flat and compact constructional shape with these features.

The term "plane" in this context is also to be understood as a slightly arcuate surface, for example the slightly curved surface of a part of the surface of an instrument panel, said surface being adjacent to a windscreen.

One further formation of the invention envisages the first component and/or the second component comprising grooves or recesses, in which the lamellae of the first and/or the second lamellar structure of the other component are at least partly guided.

By way of this, in particular one may ensure that the first component and the second component may be displaced to one another exclusively along a predefined path.

A further advantageous formation of the invention envisages providing a third component, which for closing the outflow region, is movable independently of the movement conditions of the first and the second component.

Alternatively, by way of forming closure surfaces on the first and/or the second component, one may also realize a third displacement condition in which the outflow region is closed.

BRIEF DESCRIPTION OF DRAWINGS

The invention is hereinafter explained by way of one embodiment example including several Figures. Thereby, there are shown in.

DETAILED DESCRIPTION

Figure 1:
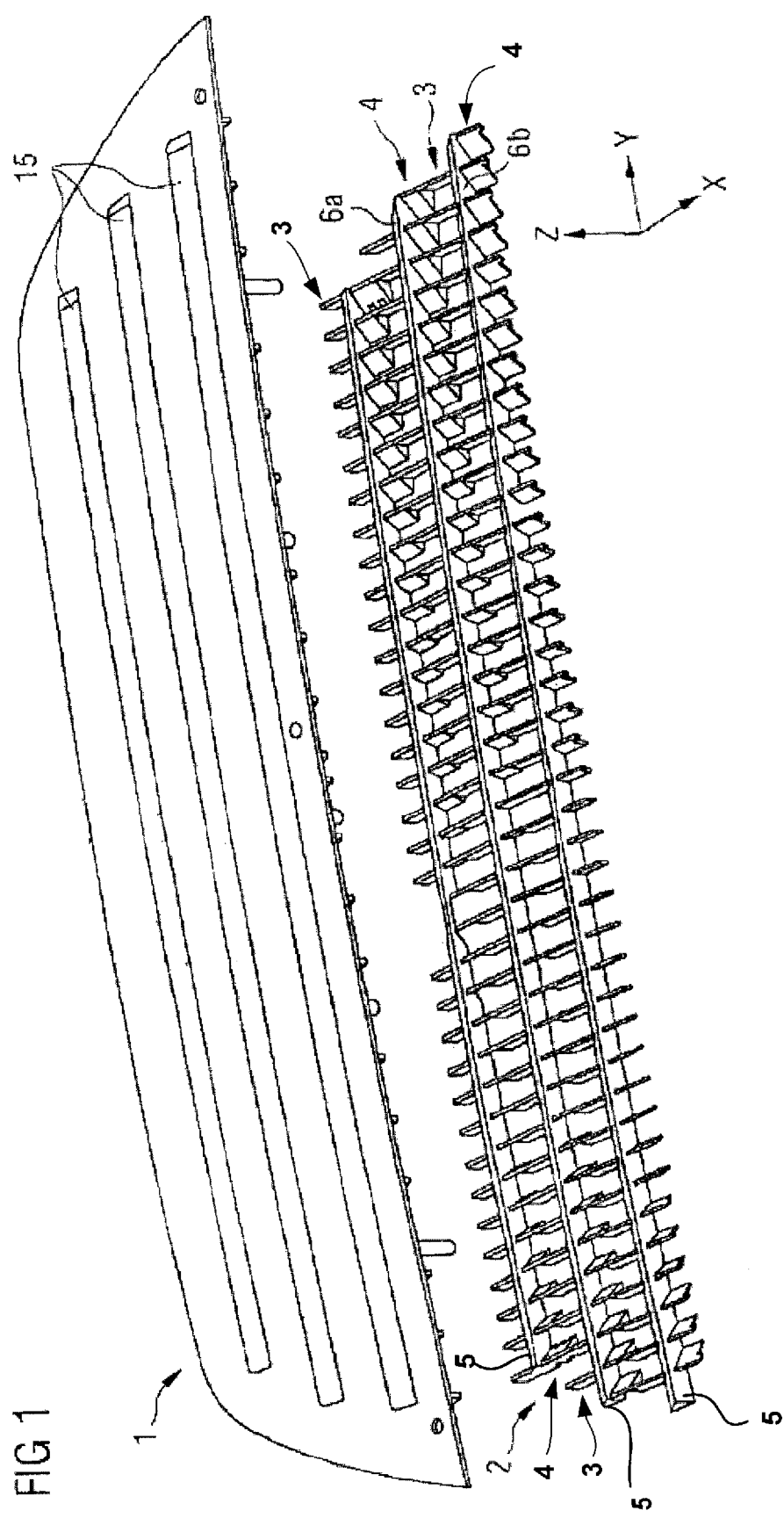
FIG. 1 a first component according to the invention, here designed as a shutter, and a second component according to the invention, here designed as a prism grid, FIG. 2 the lower side of the shutter, FIG. 3 the lower side of the shutter with an inserted prism grid, FIG. 4 the ventilation device in a first displacement condition, FIG. 5 the ventilation device in a second displacement condition, FIG. 6 the ventilation device according to the invention, integrated in an instrument panel of a vehicle, in the first displacement condition, FIG. 7 the ventilation device according to the invention, integrated in an instrument panel of a vehicle, in a second displacement condition, with a fanned-out airflow, FIG. 8 a schematic cross section of a ventilation device according to the invention, in the first displacement condition and FIG. 9 a schematic cross section of a ventilation device according to the invention, in the second displacement condition.

FIG. 1 shows a first component and second component, belonging to a ventilation device according to the invention, in this example designed as a shutter 1 or prism grid 2.

The shutter 1 is shown in FIG. 1 in a view to the viewed side. It is designed as a planar, elongate element with three rectangular elongate ventilation slots 15 which run parallel to one another. The material of the shutter 1 is plastic.

The prism grid 2 is likewise shown in a plan view. Correspondingly to the shutter 1, the prism grid 2 is designed as an elongate, planar component.

The prism grid 2 comprises three elongate webs 5 which are arranged in a common plane and parallel to one another. The webs 5 have a prismatic shape, in this embodiment example a triangular shape, in their cross section (XY-plane). Additionally, the webs 5 are hollowed out at the rear side (see FIG. 3).

In each case, a first lamellar structure 3 and a second lamellar structure 4 are arranged one after the other (X-direction) between the webs 5. In each case, a lamellar structure 3 and 4 is provided on the outer sides of the two outermost webs 5.

The first lamellar structure 3 and the second lamellar structure 4 in this case consist of a multitude of grid-like lamellae which are arranged next to one another at defined distances. The lamellae themselves are formed as planar platelets. Thereby, the lamellae of the first lamellar structure 3 are aligned parallel to one another (XZ-plane). The second lamellar structure 4 in contrast comprises lamellae which are tilted to one another in a fan-like manner.

In this embodiment example, the fanning-out of the lamellae of the second lamellar structure 4 is selected such that the lamellae located in the middle of the prism grid 2 are arranged in a common plane (XZ-plane) with the lamellae of the first lamellar structure 3, but the adjacent lamellae of the lamellar structure 4, proceeding outwards (Y-direction) from the middle of the prism grid 2, are tilted at a positive and negative angle to an ever increasing extent about the X-axis. The maximal angle, with which the respective outermost lamellae of the second lamellar structure 4 are tilted to one another, is about 70° in this embodiment example. This angle is of course dependent on the application purpose, thus may vary widely.

Lamellae of the first lamellar structure 3 and of the second lamellar structure 4 are in particular aligned perpendicularly (YZ-plane) to the parallel webs 5.

The material of the prism grid is likewise plastic.

Alternatively, metal or a combination of metal and plastic may be applied as a material for the shutter 1 and the prism grid 1.

Figure 2:
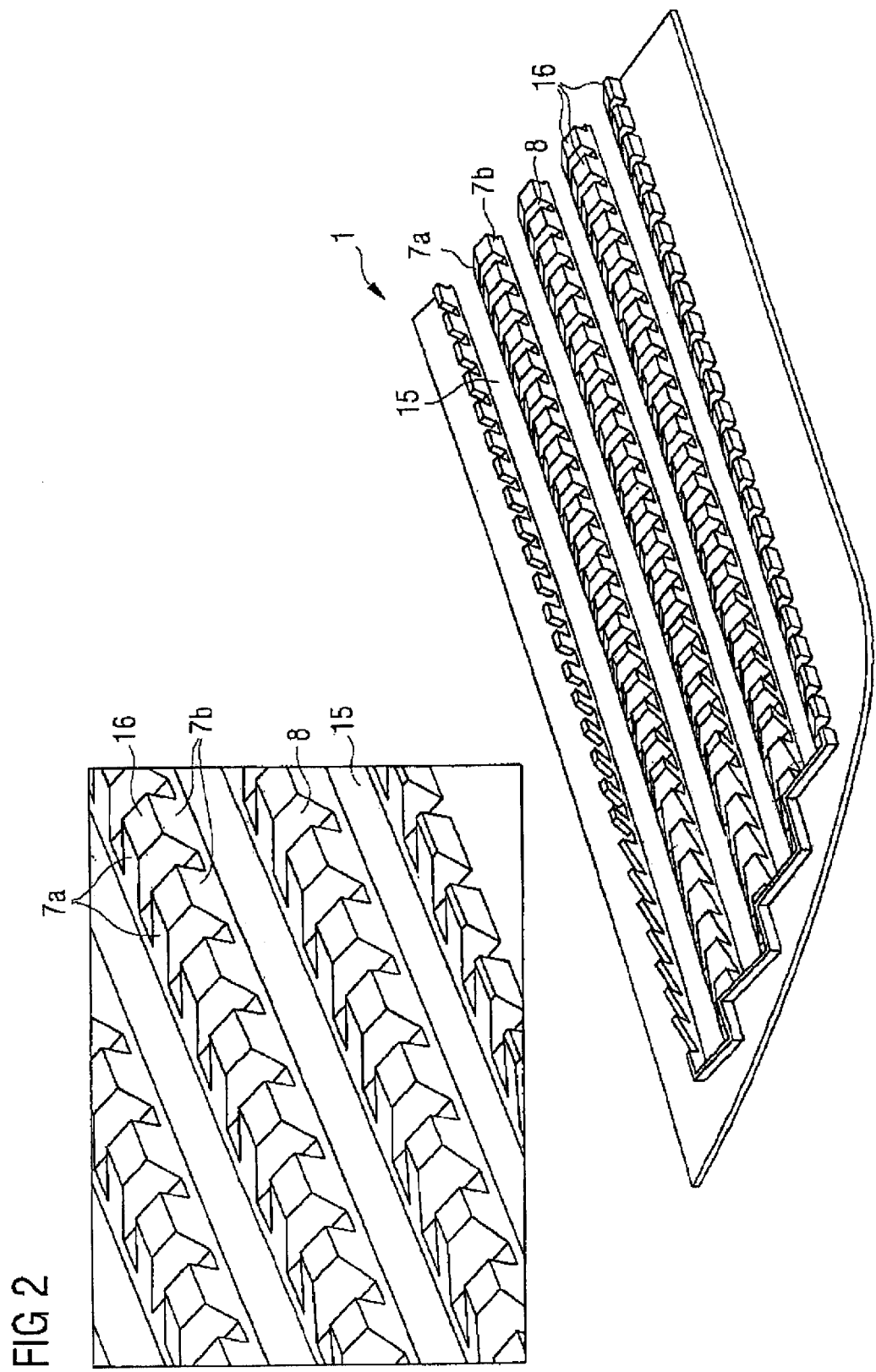

FIG. 2 shows the lower side of the shutter 1.

The lower side of the shutter 1, in contrast to the flat viewed upper side, has a grid-like structure. The structure of the lower side of the shutter 1 consists of a multitude of blocklets 16. These blocklets 16 are integrally formed in the shutter 1 as one piece.

This grid-like structure is designed such that the prism grid 2 may be accommodated and guided in this. The height of the structure thereby corresponds roughly to the height of the prism grid 2. Moreover, the structure of the lower side of the shutter 1 comprises recesses 8, into which the lamellae of the first lamellar structure 3 and of the second lamellar structure 4 are guided, for this, see FIG. 3. In particular, this permits the structure of the shutter 1 to bring the prism grid 2 arranged in this structure, into a first displacement condition, in which the lamellae of the first lamellar structure 3 are located below the ventilation slots 15, and by way of displacement, to bring the prism grid into a second displacement condition, in which the lamellae of the lamellar structure 4 are arranged below the ventilation slots 15.

Figure 3:
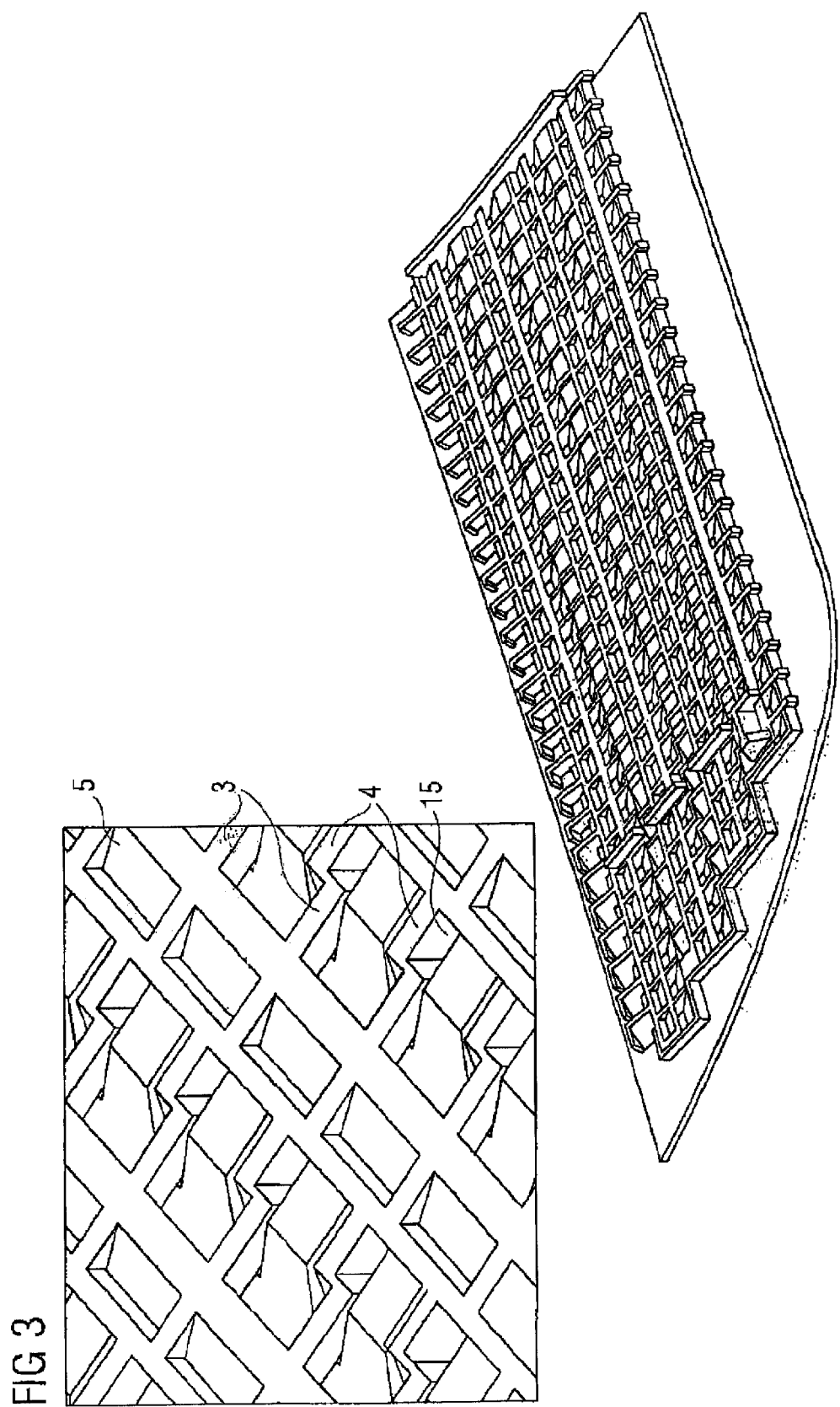

As is to be seen in FIG. 3, as a rule, in each case a blocklet 16 is located between two adjacent lamellae. The blocklets 16 fill out a large part of the volume between the webs with the exception of the recess 8 which is required for the guidance of the lamellae, so that air may be led directly through the ventilation slots 15 without swirling too much within the structure.

Moreover, the side surfaces 7a and 7b of the blocklets 16 which lie adjacent to the ventilation slots 15 are designed to match the side surfaces 6a and 6b of the webs 5 of the prism grid 2, so that in each case different closure surfaces 6a and 7a and 6b and 7b of the blocklets 16 and webs 5 bear on one another in the first and second displacement condition, by which means a different outflow angle of the air flow may be produced, additionally to the fanning-out or directing, which are effected by the arrangement of the lamellae. This principle is explained at a later point in time.

Figure 4:
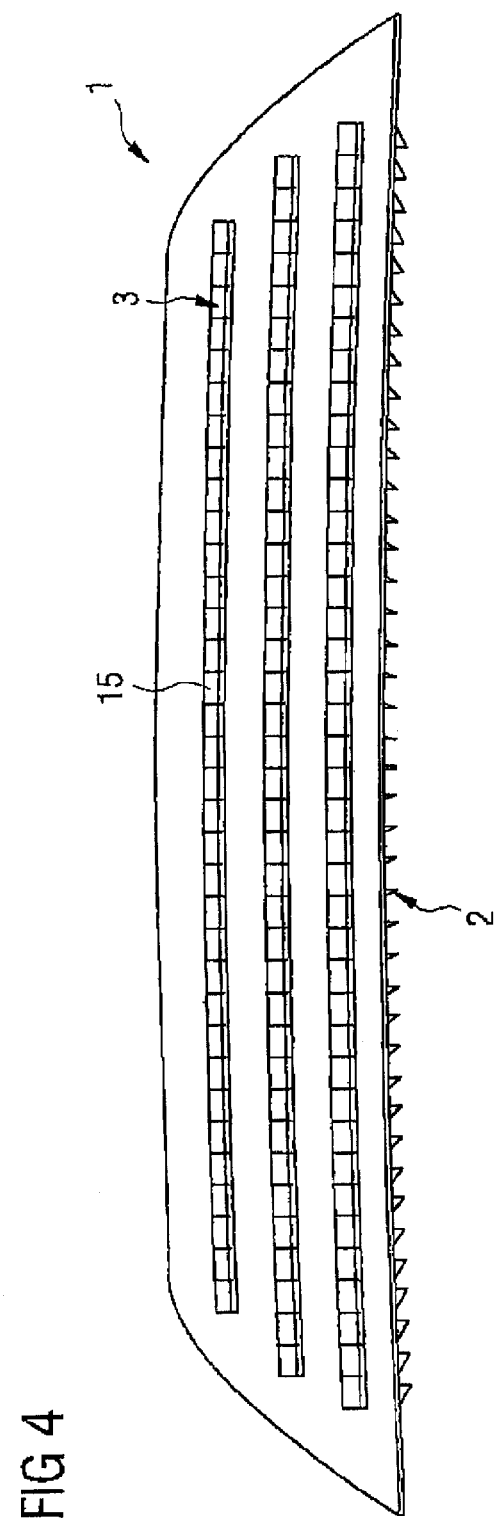

FIG. 4 shows a ventilation device according to the invention, in a first displacement condition. However, the representation is limited to the ventilation cassette, consisting of the shutter 1 and the prism grid 2 arranged below the shutter 1. The air feed channel and the outflow region which are not shown here, lie below the prism grid 2. Air may be led through the air feed channel into the outflow region, and from there, through the ventilation cassette which consist of the shutter 1 and grid 2, and which is arranged above the outflow region. Any systems, particularly those used in the automobile industry, may be applied as an air feed channel and outflow region.

One may easily recognise in FIG. 4, that it is exclusively the first lamellar structures 3 which are located below the longitudinal slots 15. If air flows through this ventilation cassette, then a first directed airflow 13 is produced.

Figure 5:
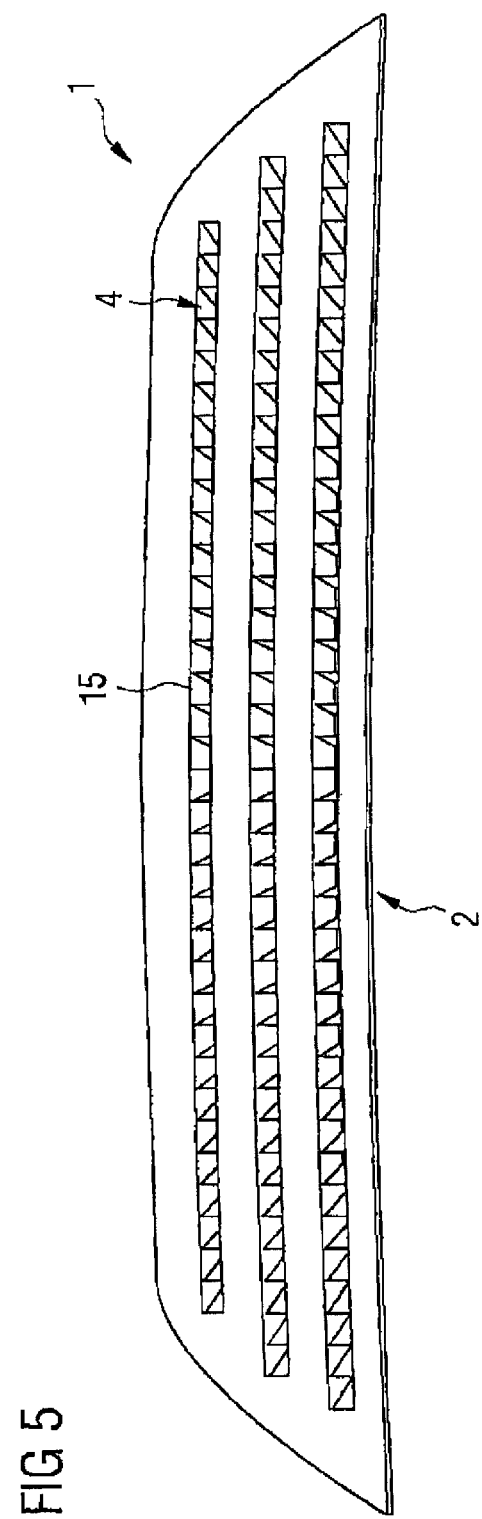

FIG. 5 shows the ventilation device in the second displacement condition.

In this displacement condition, only the second lamellae structures 4 with their fanned-out lamellae are located below the ventilation slots 15 of the shutter 1. If air flows through the ventilation cassette, then a second, fanned-out airflow is produced.

Figure 6:
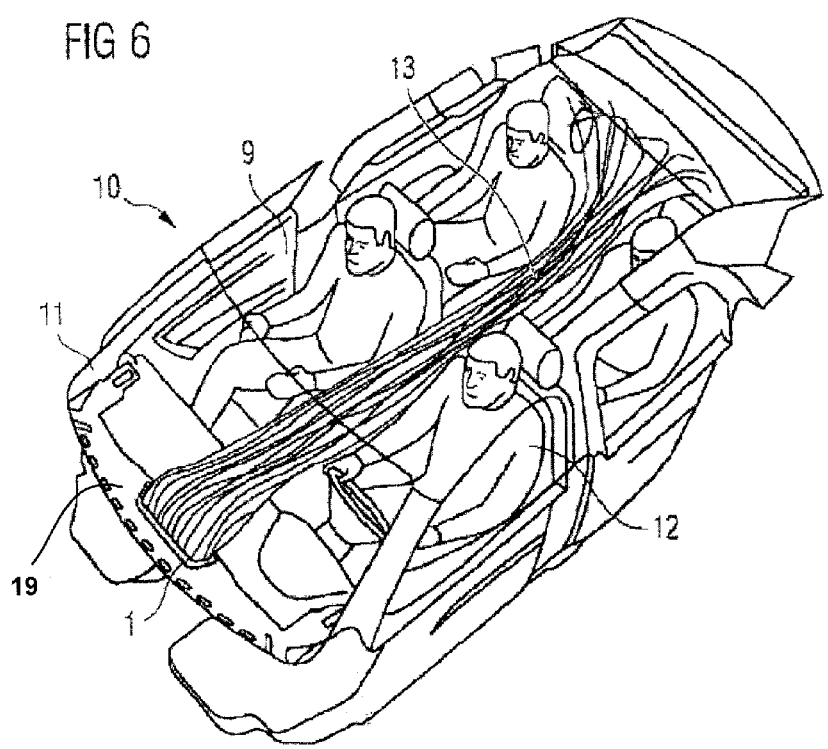

FIG. 6 shows a ventilation device according to the invention, integrated into a trim part 19 which, in this embodiment, is an instrument panel of a vehicle, in the first displacement condition.

In this embodiment example, the ventilation device according to the invention (more accurately: the shutter 1), is arranged adjacent to a windscreen 11. The shutter 1 thereby, with regard to its dimensions, assumes the middle third of the surface of the instrument panel.

As is seen in FIG. 6, a first airflow 13 is produced by the ventilation device according to the invention, and this airflow is directed directly into the interior 9 of the vehicle 10. The angle at which the air flows out, is thereby selected such that the airflow 12 may go through and between the driver and front seat passenger in an essential directed manner. The opening angle of the airflow 13 which is set by the lamellae of the first lamellar structure 3, is negligible small.

Figure 7:
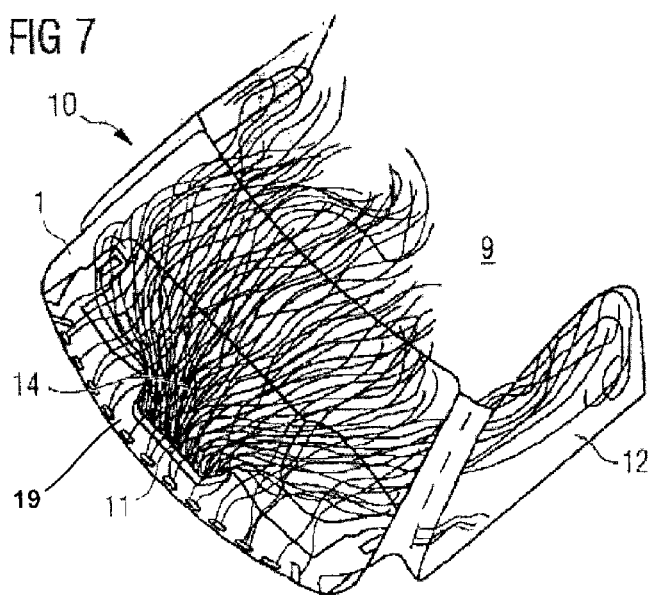

FIG. 7 shows the same ventilation device, integrated in the instrument panel of a vehicle in the second displacement condition.

In this example, the ventilation cassette with the shutter and the prism grid 2 is designed such that in the second displacement condition, a fanned-out airflow is produced, which, in contrast to the first airflow 13 produced in the first displacement condition, is guided directly against the windscreen 11 of the vehicle 10. Due to the effect of the fanning-out of the airflow, it is particularly the case that the whole windscreen 11 is affected, by which means one achieves a complete defrosting. The opening angle of the airflow which is defined by the lamellae of the lamellar structure 14, is about 70°.

Alternatively to the embodiment of a ventilation device according to the invention described here, both lamellae structures 3 and 4 may also in particular be fanned-out. For example, in this manner, analogously to the above example, an airflow may be realized in a first displacement condition, which although being directed directly into the vehicle interior, is however slightly fanned-out, thus has a small opening angle, and thus would gently a subject a driver and a front seat passenger to airflow.

Moreover, additional further lamellar structures may be integrated in a ventilation device according to the invention.

Hereinafter, it is explained in more detail how airflows with different exit angles may be produced in the first and second displacement condition.

For this, FIG. 8 shows a schematic cross-sectional view of a ventilation device according to the invention, in a first displacement condition.

However, only the blocklets 16 of the structure of the lower side of the shutter 1 and the webs 5 of the prism grid 2 as well as the air feed channel 18 are shown. The plane of the cross section is the XZ-pane, cf. FIG. 1.

In the first displacement condition, a second side surface 6b of a web 5 bears on a second side surface 7b of a blocklet 16. A gap through which the air may flow arises between a first side surface 6a of the web 5 and a first side surface 7a of the adjacent blocklet 16, which lies opposite this side surface 7a. The orientation of the side surfaces 7a of the blocklet 16, and 7b of the web thereby define the shape of the air channel and thus also the outflow angle. The side surfaces 6a and 7a are designed in this embodiment example, are designed such that an airflow with an exit angle of 45° with respect to the Z-axis is produced.

The webs 5 may be brought into the second displacement condition by way of displacing the prism grid 2.

FIG. 9 shows a schematic cross sectional view (XZ-plane) of an ventilation device according to the invention, in the second displacement condition.

In the second displacement condition, a first side surface 6a of a web 5 lies on the first side surface 7a of a blocklet 16. A gap through which the air may flow out, is formed between the second side surface 6b of the web 5 and the second side surface 7b of the adjacent blocklet 16. The shape of the gap thereby is given by the geometry of the side surfaces 6b and 7b. In this case, the side surfaces 6b and 7b are designed such that a gap parallel to the Z-direction is formed, through which an airflow which is essentially parallel to the Z-direction may be produced.

In this embodiment example, the webs 5 are triangular in their cross section and the blocklets 16 are rectangular. Basically here, also other shapes, for example webs with rectangular cross section and blocklets with a triangular cross section, as well as basically different shapes may be applied.

Apart from the shutter 1 and the prism grid 2 shown here, the ventilation device may also contain a third component, with which the ventilation slots 15 of the shutter 1 may be closed. One possible embodiment of such a component would be a planar element with ventilation slots 15 dimensioned according to closed surfaces 15 which by way of displacement may be brought into congruity with the ventilation slots 15.

Alternatively, it is also possible to integrate such a function in the prism grid 2. For example, a closed surface may be provided between the webs 5, which may be brought into congruity with the ventilation slots 15 by way of displacing the prism grid 2.

The invention claimed is:

1. A ventilation device, comprising:
   an air feed channel extending to an outflow region; and
   first and second flow direction components in the outflow region, the second flow direction component comprising a first lamellar structure and a second lamellar structure, the first and second flow direction components being coupled for movement relative to one another between a first configuration in which air flow from the air feed channel flows out only through the first lamellar structure of the second flow direction component and a second configuration in which air flow from the air feed channel flows out only through the second lamellar structure of the second flow direction component, lamellae of the first lamellar structure lying substantially parallel to one another, while lamellae of the second lamellar structure are tilted to one another in a fan-like manner.

2. The ventilation device according to claim 1, wherein the device is arranged in a vehicle interior.

3. The ventilation device according to claim 1, wherein the first and second lamellar structures form a grid.

4. The ventilation device according to claim 1, closure surfaces of the first and second flow direction components bear on one another in the first and second configurations to alter an outflow angle of air flow between a direct outflow through the first lamellar structure and a diffused outflow through the second lamellar structure.

5. The ventilation device according to claim 4, wherein the second flow direction component includes prismatically triangularly shaped webs.

6. The ventilation device according to claim 4, wherein the second flow direction component includes prismatically shaped webs having a triangular cross-section.

7. The ventilation device according to claim 5, wherein the prismatically shaped webs are arranged in a common plane substantially parallel to one another and wherein the lamellae of the first and second lamellar structures are directed perpendicularly to the parallel webs and situated one behind the other between two adjacent webs.

8. The ventilation device according to claim 1, wherein the first flow direction component includes one of grooves and recesses, in which the lamellae of at least one of the first and second lamellar structures of the second flow direction component are at least partly led.

9. The ventilation device according to claim 1, wherein at least one of the first flow direction component and the second flow direction component is composed of one of plastic and metal.

10. A trim part, comprising:
    a ventilation device including (a) an air feed channel extending to an outflow region; and (b) first and second flow direction components in the outflow region, the second flow direction component comprising a first lamellar structure and a second lamellar structure, the first and second flow direction components being coupled for movement relative to one another between a first configuration in which air flow from the air feed channel flows out only through the first lamellar structure of the second flow direction component and a second configuration in which air flow from the air feed channel flows out only through the second lamellar structure of the second flow direction component, lamellae of the first lamellar structure lying substantially parallel to one another, while lamellae of the second lamellar structure are tilted to one another in a fan-like manner.

11. A motor vehicle, comprising:
    a windscreen; and
    a ventilation device including (a) an air feed channel extending to an outflow region; and (b) first and second flow direction components in the outflow region, the second flow direction component comprising a first lamellar structure and a second lamellar structure, the first and second flow direction components being coupled for movement relative to one another between a first configuration in which air flow from the air feed channel flows out only through the first lamellar structure of the second flow direction component and a second configuration in which air flow from the air feed channel flows out only through the second lamellar structure of the second flow direction component, lamellae of the first lamellar structure lying substantially parallel to one another, while lamellae of the second lamellar structure are tilted to one another in a fan-like manner,
    wherein the outflow region is arranged in an interior of the motor vehicle and adjacent to the windscreen.

12. A motor vehicle, comprising:
    a windscreen; and
    a ventilation device including (a) an air feed channel extending to an outflow region; and (b) first and second flow direction components in the outflow region, the second flow direction component comprising a first lamellar structure and a second lamellar structure, the first and second flow direction components being coupled for movement relative to one another between a first configuration in which air flow from the air feed channel flows out only through the first lamellar structure of the second flow direction component and a second configuration in which air flow from the air feed channel flows out only through the second lamellar structure of the second flow direction component, lamellae of the first lamellar structure lying substantially parallel to one another, while lamellae of the second lamellar structure are tilted to one another in a fan-like manner,
    wherein the ventilation device and the outflow region are arranged in an interior of the motor vehicle, the outflow region being adjacent to the windscreen and wherein, in the first configuration, the air outflow is directed towards a center of the interior and, in the second configuration, the air outflow is directed to the windscreen.

* * * * *